United States Patent [19]

Mueller

[11] 4,163,720
[45] Aug. 7, 1979

[54] APPARATUS FOR THE BIOLOGICAL PURIFICATION OF WASTE WATER

[75] Inventor: Hans Müeller, Erlenbach, Switzerland

[73] Assignee: PEC Process Engineering Company SA, Maennedorf, Switzerland

[21] Appl. No.: 884,632

[22] Filed: Mar. 6, 1978

[30] Foreign Application Priority Data

Mar. 4, 1977 [CH] Switzerland ............... 2715/77

[51] Int. Cl.² ............................................. C02C 1/26
[52] U.S. Cl. .............................. 210/197; 210/207; 210/256; 210/533
[58] Field of Search ............ 210/16, 197, 207, 208, 210/256, 12, 532 R, 532 S, 170, 533–536, 195 S, 218

[56] References Cited

U.S. PATENT DOCUMENTS

| | | | |
|---|---|---|---|
| 3,010,581 | 11/1961 | Knapp et al. | 210/16 |
| 3,166,501 | 1/1965 | Spohr | 210/16 |
| 3,168,465 | 2/1965 | Kraus et al. | 210/16 |
| 3,753,897 | 8/1973 | Lin et al. | 210/256 |
| 3,963,619 | 6/1976 | Caillaud et al. | 210/532 R |
| 4,033,875 | 7/1977 | Besik | 210/207 |

*Primary Examiner*—Benoit Castel
*Attorney, Agent, or Firm*—Michael J. Striker

[57] ABSTRACT

An apparatus is provided for the multistage biological purification of waste water containing organic substances including carbohydrates and proteins. The apparatus comprises an at least substantially closed first tank for holding waste water while maintaining the waste water at least substantially free from contact with air so as to prevent further oxygen from becoming dissolved in the waster water. The apparatus also includes a second tank including an aerator for dissolving oxygen in waste water contained in the said tank, the second tank being located inside the first tank and including a conical bottom portion for receiving sludge produced by aerobic degradation of the waste water in the second tank.

9 Claims, 4 Drawing Figures

APPARATUS FOR THE BIOLOGICAL PURIFICATION OF WASTE WATER

BACKGROUND OF THE INVENTION

The invention relates to an apparatus for the multistage biological purification of waste water, particularly for the degradation of carbohydrate and protein-containing industrial waste water.

Highly polluted waste water is very effectively purified through a combination of anaerobic and aerobic degradation. Such processes are well known. The waste water is first treated in an anaerobic stage in order to produce methane and is subsequently treated aerobically in an activated sludge process to cause oxidation and flocculation of the sewage by bacterial action. The sewage then settles and yields a harmless effluent.

This combination of anaerobic and aerobic treatment can attain a 99.9% reduction in the biochemical demand of waste water.

The conventional processes are satisfactory for purifying but have the disadvantage of requiring a large number of both large and small apparatuses and containers as well as suitable conduits between them. Also, the separation of the activated sludge in the aerated tank is difficult; separation can only be achieved by the addition of a settling tank to the treatment facility. It now appears that special compact integral parts can be built for small and intermediate installations; these compact parts are relatively simple to operate and, with appropriate waste water flow, require less expense. This is what the present invention relates to.

SUMMARY OF THE INVENTION

An object of the invention is to provide a simplified, space- and material-saving apparatus for the multistage biological purification of highly polluted waste water, particularly for the degradation of carbohydrate- and protein-containing industrial waste water.

In accordance with the inventive concept, an aeration tank is installed in a tank for the anaerobic degradation of the waste water. The aeration tank has a lower portion shaped like a cone for the reception of sludge. Through aerobic oxidation of the organic substances by microorganisms, the thereby evolved heat is directly used for the heating of the anaerobic stage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
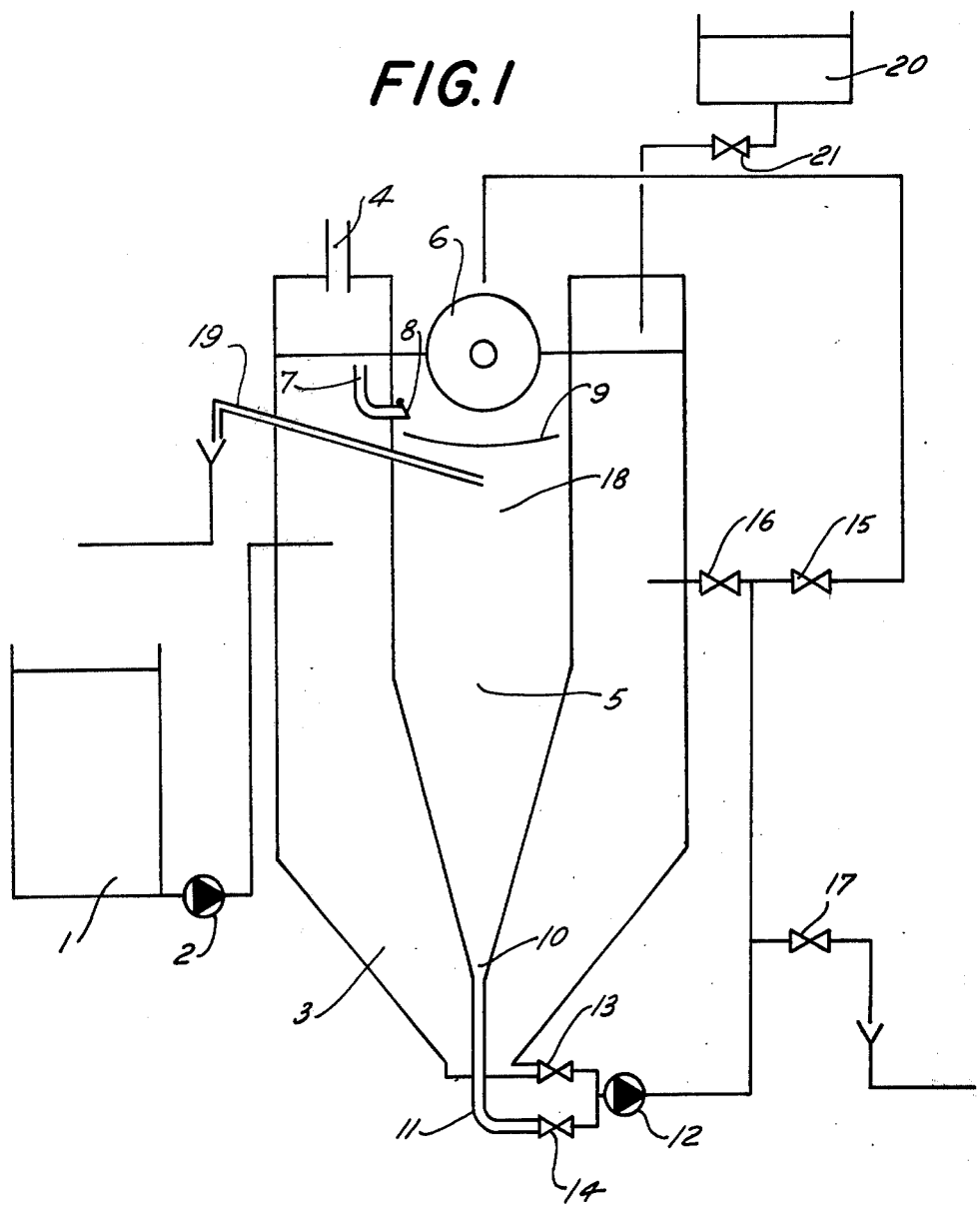
FIG. 1 is a schematic cross-section through the inventive apparatus.

FIG. 1 shows an example of the inventive apparatus, in cross section, within an upright tank. This apparatus, however, could be installed in a horizontal tank. Pump 2 connects tank 1 to tank 3. Tank 3 is closed, and has a vent 4. Tank 5 is installed within tank 3 and is provided with a settling cone. This tank 5 is open to the atmosphere at the top and is provided with an aerator 6, which may have any of a variety of designs. A conduit 7 connects tank 3 to tank 5; the conduit 7 is preferably provided with a check valve 8. Tank 5 is shaped as a sediment-collecting vessel. Below the aerator 6, the tank 5 has a baffle plate 9. The baffle plate 9 directs the movement of sludge in the desired direction-apertures in the baffle plate and are present only along the walls of the tank. The cone 10 is connected to a pump 12 by a conduit 11 and a valve 14. A similar valve 13 is provided in the discharge conduit between the tank 3 and the pump 12. The valves 15 and 16 are installed in the return line; the valve 17 is installed in the exhaust vent line. The apertures 18 of the sluable drain 19 open below the baffle plate 9. A tank 20 containing an alkaline solution is connected to the tank 3 by a conduit and a valve 21 within that conduit.

Figure 4:
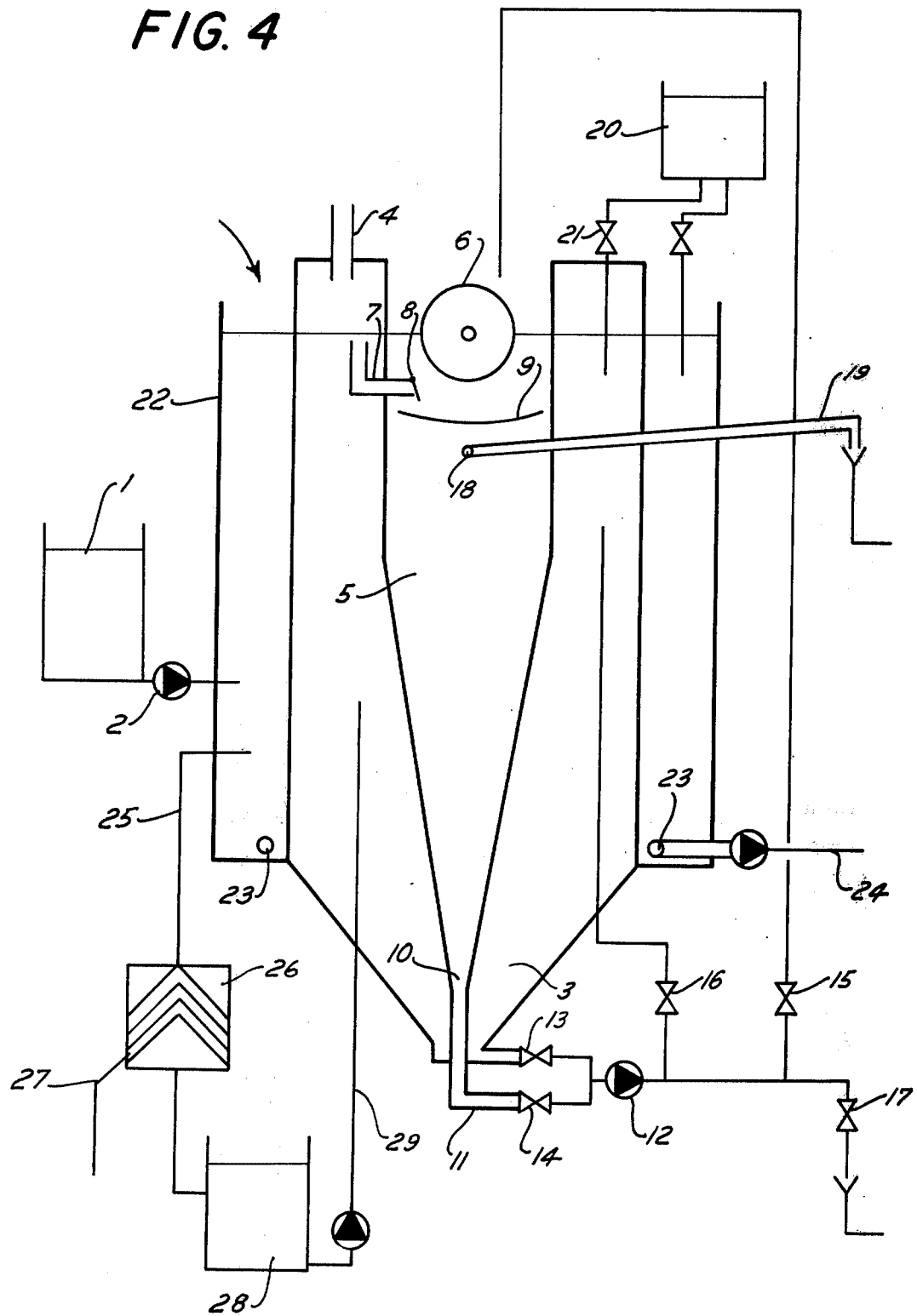
FIG. 4 shows another embodiment with a preparation apparatus.

FIG. 4 shows another embodiment of the inventive concept, this embodiment being specifically intended for protein and carbohydrate recovery; the tank 3 is surrounded by a container-like jacket 22. This jacket 22 has a bottom portion provided with an aerator 23, which is connected to a conduit 24 for compressed air. A conduit 25 enters the jacket 22 from a separator 26, which can be a centrifuge and/or a filter. The conduit 27 for the concentrated biomass (including proteins and carbohydrates) extends from the separator 26 to an unillustrated drier. A conduit for the filtrate leads from the bottom of the separator 26 to a tank 28; a conduit 29 leads from the tank 28 back into the tank 3.

In operation, the waste water passes from tank 1 under the force provided by the pump 2 into tank 3, in which the anaerobic stage of treatment is performed. The methane gas forming during the anaerobic fermentation is carried away from tank 3 by a vent 4 after purification to an unillustrated gas receiver. The overflow of the anaerobically treated waste water is conveyed into an end of the conduit 7. At the opposite end of this conduit 7 and inside aerator tank 5 is a check valve 8, which acts to prevent backflow of aerated water into the anaerobic tank 3. The aerator aggregate 6 is activated by a conventional drive unit. The baffle plate 9, appropriately located below the top level of the aerated water, serves to separate the aerating zone from a calm zone underneath. The sludge can therefore sediment downwardly only alongside the walls.

The aerobically formed sludge falls downwardly into the cone 10 of the tank 5. The sludge is then drawn off through conduit 11 under the force of pump 12. Simultaneously, pump 12 also draws off the anaerobically formed sludge from tank 3. The proportion of aerobically formed to anaerobically formed sludge can be adjusted by means of the valves 13 and 14. A portion of the resulting sludge mixture can be directed into the anaerobic tank 3 by way of valve 16 and under the force of pump 12. Another portion can be similarly directed into the aerobic tank 5 by way of valve 15. Excess sludge is discharged from the system through valve 17. The excess sludge typically amounts to about 5–10% of the total sludge. The purified water is withdrawn from the calm area in the aerobic tank 5, i.e., that portion below the baffle plate 9. The outlet 19 serves as the withdrawing means; it can be adjusted to enter the calm zone at varying desirable heights of the aerobic tank 5. Such an adjustment will regulate the waste water level in both tanks 3 and 5 since they are connected via conduit 7. An alkaline solution is supplied to the anaerobic tank 3 from tank 20 in order to maintain the conventionally desirable pH for the anaerobic treatment by neutralizing the generated acidity.

Figure 2:
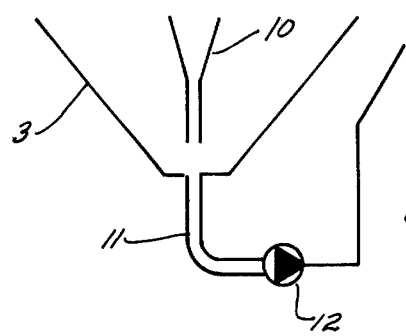
FIG. 2 shows a variation of the sludge discharge shown in FIG. 1.

The illustrated arrangement is a self-regulatable system with the exception of the sludge return lines. Generally, the volume of sludge produced by the anaerobic tank relative to that produced by the aerobic tank is in a proportion of 1:5 to 1:10. In certain cases, the anaerobically produced sludge and aerobically produced sludge can be mixed in a bottom portion common to both tanks 3 and 5 (as illustrated by FIG. 2). Then, sludge in the aerobic tank 5 falls directly onto the anaerobically produced sludge—both are then drawn off together by pump 12.

Figure 3:
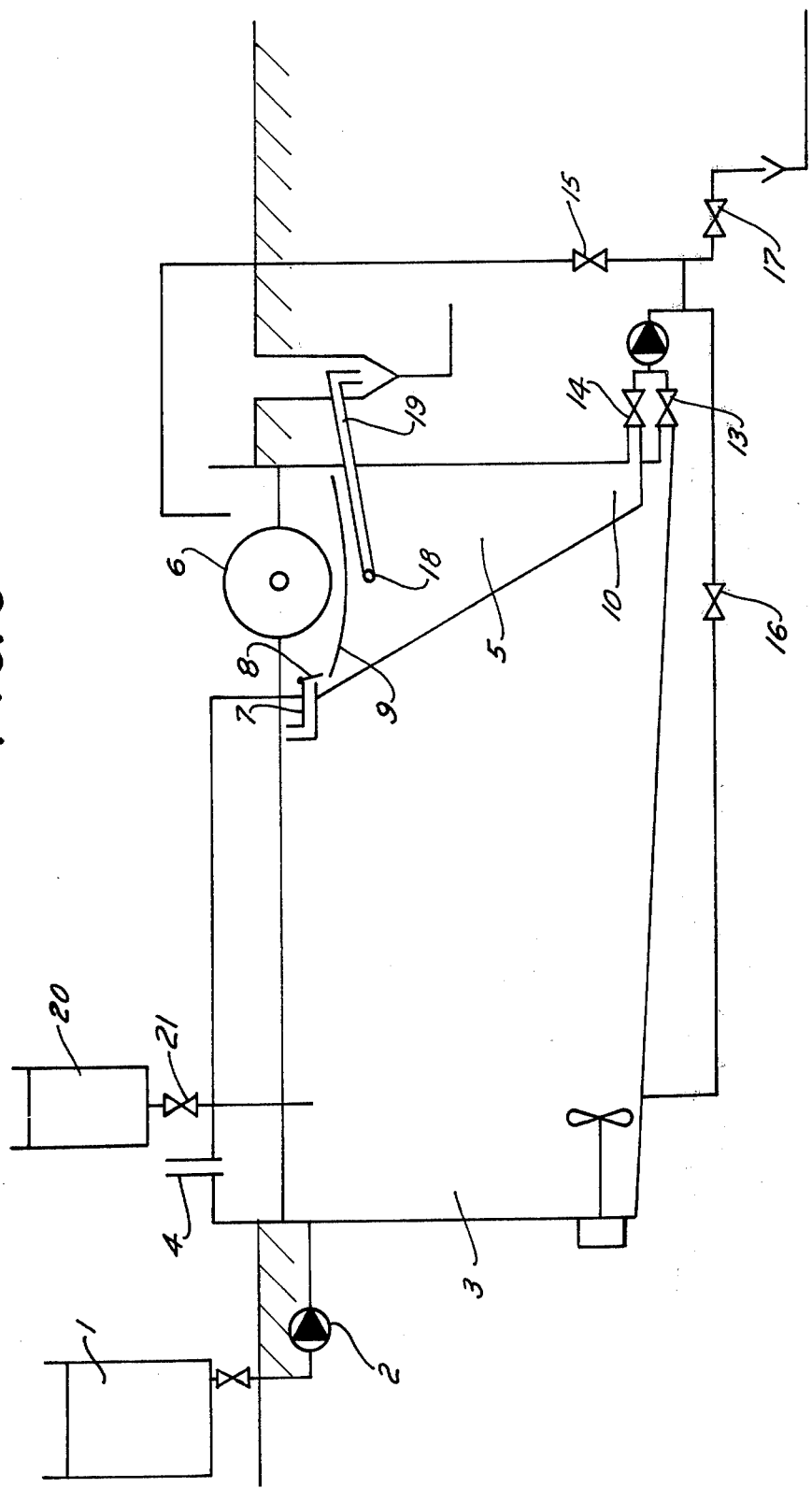
FIG. 3 shows the installation of FIG. 1 in a rectangular container.

FIG. 3 shows the inventive arrangement in a rectangular tank which can be constructed either above or below ground.

The above-described apparatus is particularly suitable for treating highly polluted waste water, particularly so when it is important to use the most economical means for purifying such water without concern for recovering potentially utilizable compounds other than methane—which can be used to help to heat the anaerobic stage to conventionally desirable temperatures.

To recover carbohydrates and proteins, a further embodiment is provided. In many cases, substances in waste water can be utilizable-recycled—for instance, whey protein and proteins in brewery and foodstuff waster water. Where desirable, these and like substances can be collected through a combination of the inventive aerobic/anaerobic treatment installation with a means for recovery of the proteins and carbohydrates.

FIG. 4 shows an apparatus for such a combination. The second and third stages of purification correspond to those previously described in descriptions of FIGS. 1-3. A jacket (that is, a further container) 22 is installed around the anaerobic tank 3. The jacket 22 is equipped with an aerator 23 at the bottom of the jacket 22 and a compressed air conduit 24. The waste water enters into the jacket 22 from tank 1 under the force of pump 2. Carbohydrate-containing waste water, like whey waste water, is fermented with a yeast and the biomass from the jacket 22 is separated by means of a centrifuge 26. The concentrated biomass is withdrawn from centrifuge 26 by way of conduit 27 which leads to a conventional drier. Afterwards, the dried biomass is ready for foodstuff preparation. The residual effluent and the wash water is directed into tank 28 from which it is pumped through conduit 29 into anaerobic tank 3.

The heat produced during the yeast fermentation is used to heat the anaerobic tank 3 to a temperature of 35°–40° C. in order to accelerate the anaerobic degradation.

The waste water from the centrifuge still has a relatively high biochemical oxygen demand. This waste water is directed into the anaerobic tank 3 and subsequently into the aerator tank 5 in order to drastically reduce the biochemical oxygen demand—to substantially no more than 1.2% of the biochemical oxygen demand of the waste water leaving the centrifuge. By-products recovered from the degradation of the wastes therefore include a valuable feed yeast (about 2% by weight) as well as methane (about 0.5 m$^3$/kg biochemical oxygen demand). The dwell time in the anaerobic tank is about 5–10 days.

From brewery waste water containing roughly 3% by volume alcohol, yeast in an amount of 1.5% by weight can be produced.

The inventive concept can also be applied to processings of diverse wastes like the residual liquid from distillation of alcohol, fruit residues, waste water from fermentation, or to processes involving antibiotic production, amino acid production and citric acid production as well as to waste water from the starch and sugar industries.

It will be understood that each of the elements described above, or two or more together, may also find a useful application in other types of process and apparatus for the biological purification of waste water differing from the types described above.

While the invention has been illustrated and described as embodied in a construction and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention.

What is claimed as new and desired to be protected by Letters Patent is set forth in the appended claims.

1. An apparatus for the multistage biological purification of waste water containing organic substances including carbohydrates and proteins, the apparatus comprising in combination an at least substantially closed first tank having a first inlet for waste water and a first outlet for withdrawing sludge produced by an aerobic degradation in said first tank, the latter being operative for holding the waste water at least substantially free from contact with air so as to prevent further oxygen from becoming dissolved in the waste water; means communicating with said first tank for admitting a pH regulating substance into the same; a second tank located inside said first tank and including an aerator in a top portion of said second tank for dissolving oxygen in the waste water contained in said second tank, said second tank having a second outlet for withdrawing sludge produced by aerobic degradation of the waste water in said second tank; at least one conduit connecting said first tank with said second tank for conducting the waste water from said first tank into said second tank, said conduit having a first end within said first tank and a second end within said second tank above the level of said second outlet; means for recycling some of said sludge to the respective tanks; guide means including a baffle plate in said second tank located below said second end of said conduit and operative for guiding the sludge produced by aerobic degradation alongside the walls of said second tank towards said second outlet thereof; first means for withdrawing purified water from said second tank, including a conduit having one end portion in said second tank below said guide means and another end portion extending outwardly away from and beyond said first and second tanks second withdrawing means connected to the respective first and second outlets and leading away from said first and second tanks for withdrawing sludge therefrom; and regulating means connected to said second withdrawing means for regulating withdrawal of sludge from said first and second tanks.

2. The apparatus defined in claim 1, said regulating means including means for regulating sludge discharge from each tank independently of the other tank.

3. The apparatus defined in claim 1, said second withdrawing means including a pump for withdrawing sludge produced in both tanks.

4. The apparatus defined in claim 1, said first tank being a substantially upright cylinder.

5. The apparatus defined in claim 1, said first tank being a substantially horizontal cylinder.

6. The apparatus defined in claim 1, said first tank being rectangular.

7. The apparatus defined in claim 1, wherein said second tank includes a conical bottom portion provided with said second outlet and operative for receiving sludge produced by aerobic degradation of the waste water in said second tank.

8. The apparatus defined in claim 7, said baffle plate having apertures at its periphery and an unapertured center plate whereby sludge passes through the apertures and thereby falls to the conical bottom portion in a substantially predetermined path alongside the walls of said second tank.

9. An apparatus for the multistage biological purification of waste water containing organic substances including carbohydrates and proteins, the apparatus comprising in combination a first tank having a first inlet for waste water; means for separating carbohydrates and proteins from the waste water contained in said first tank to obtain a filtrate; a second tank located inside said first tank, said second tank being substantially closed for holding the waste water substantially free from contact with air so as to prevent further oxygen from becoming dissolved in the waste water; means for supplying the filtrate from said recovering means into said second tank; means for admitting a pH regulating substance into at least one of said first and second tanks; a first aerator within said first tank so as to dissolve oxygen within the waste water contained in said first tank to thereby provide an appropriate dissolved oxygen level for aerobic oxidation of the waste water, whereby bacteria within the waste water can aerobically oxidize the waste water to thereby generate heat which is conducted to said second tank to accelerate anaerobic degradation therein; a third tank located inside said second tank and including a second aerator for dissolving oxygen in the waste water contained in said third tank; at least one conduit connecting said second and third tanks for conducting the waste water from said second tank into said third tank; guide means including a baffle plate in said third tank for guiding sludge produced by aerobic degradation alongside the walls of said third tank towards an outlet thereof; means for withdrawing purified water from said third tank; and means for withdrawing sludge produced by degradation in the second and third tanks and for recycling some of said sludge into said second and third tanks respectively.

* * * * *